United States Patent [19]

Gerlach et al.

[11] Patent Number: 5,679,882
[45] Date of Patent: Oct. 21, 1997

[54] METHOD AND APPARATUS FOR MAKING LOAD MEASURING PICK-UPS LESS SENSITIVE TO OFF-CENTER LOAD APPLICATION

[75] Inventors: Hans-Joachim Gerlach, Hoechst-Hassenroth; Heinz Ronald Will, Alsbach-Haehnlein; Ralf Waegner, Trebur; Werner Schlachter, Darmstadt, all of Germany

[73] Assignee: Hottinger Baldwin Messtechnik GmbH, Darmstadt, Germany

[21] Appl. No.: 433,617

[22] Filed: May 3, 1995

[30] Foreign Application Priority Data

May 11, 1994 [DE] Germany ............... 44 16 442.4

[51] Int. Cl.[6] .................................. G01G 13/14
[52] U.S. Cl. .................. 73/1 B; 177/1; 177/50
[58] Field of Search ................ 73/1 B, 862.08, 73/862.321, 862.338; 177/50, 1; 364/571.01, 571.02, 571.04, 571.05, 571.07

[56] References Cited

U.S. PATENT DOCUMENTS

| | | | |
|---|---|---|---|
| 4,331,035 | 5/1982 | Eisele et al. | 73/1 B X |
| 4,815,547 | 3/1989 | Dillon et al. | 177/25.14 |
| 4,848,477 | 7/1989 | Oldendorf et al. | 177/50 X |
| 4,909,338 | 3/1990 | Vitrnic et al. | 177/50 |
| 4,958,526 | 9/1990 | Haggstrom | 73/1 B X |
| 5,355,715 | 10/1994 | Rausche et al. | 73/1 B |

FOREIGN PATENT DOCUMENTS

| | | |
|---|---|---|
| 0089209 | 9/1983 | European Pat. Off. |
| 62-066127 | 3/1987 | Japan. |
| 63-273028 | 11/1988 | Japan. |

OTHER PUBLICATIONS

H. Leinonen, Experiments And Analysis Of Force Transmission In Force Transducers To Improve Their Characteristics, Measurement, vol. 6, No. 2, Apr.–Jun. 1988, pp. 81 to 86.

S.N. Pogodin, Automated Calculating System For Investigation Of Elastic Characteristics Of Strain–Gauge Dynamometers, Measurement Techniques, Apr. 1992, pp. 408 to 411.

Primary Examiner—Michael L. Gellner
Assistant Examiner—Randy W. Gibson
Attorney, Agent, or Firm—W. G. Fasse; W. F. Fasse

[57] ABSTRACT

A measuring pick-up or detector shall be made less sensitive against off-center load applications if necessary. At least it must be made certain that the off-center load sensitivity is within a permissible tolerance range. For this purpose the sensor body (1A, 1', SB) of the detector (1) to which there is applied at least one pick-up element or strain gage (5), is held for each load application in a different fixed position in a mounting (2) in such a way that, spaced from the clamping position a test load can be applied in a direction deviating from the direction and/or position of the axis of symmetry (CA, AS) of the sensor body (1A, 1', SB). A respective output signal is measured and correlated to the applied test load. At least one additional test load of the same size is applied in a different load application direction, and the respective output signal is again measured and correlated to the second test load. Then, the output signals are evaluated with reference to a tolerance range (TR) stored in a memory of a control unit (11) to determine whether a tuning of the sensor body is necessary to make the pick-up less sensitive. If such tuning is necessary, at least one tuning is performed. The tuning may be a mechanical material removal from the sensor body and/or as an electrical tuning by resistor adjustments.

20 Claims, 6 Drawing Sheets

METHOD AND APPARATUS FOR MAKING LOAD MEASURING PICK-UPS LESS SENSITIVE TO OFF-CENTER LOAD APPLICATION

FIELD OF THE INVENTION

The invention relates to a method and apparatus for making measuring pick-ups less sensitive to variations in the load application, such as variations in the direction of the load application and variations in the point of load application. Both types of variations are referred to herein as off-center load applications. A tuning procedure achieves the reduced sensitivity to off-center load applications.

BACKGROUND INFORMATION

Measuring pick-ups such as force pick-ups or load cells having a sensor body to which at least one strain gage is applied, are generally sensitive to variations in the load application conditions. Thus, the measuring characteristics of such pick-ups may change when the load application conditions change. For example, different measuring results may be obtained for the same applied load if even minor angular deviations occur in the direction of the load application such as an angular deviation from a vertical load application direction or in the point of load application. Non-uniformities and non-symmetries in the construction of the sensor body and/or in the strain gage element or elements applied to the sensor body provide further sources for variations in the measuring characteristic of such pick-ups. These other causes are due to manufacturing tolerances which cannot be avoided.

In order to assure exact measuring results that are consistently repeatable, it is necessary to take steps that eliminate the possibly adverse influences of load application conditions that may vary due to the above mentioned causes. However, conventionally these steps have to generally be taken after the installation of the measuring pick-up for example in a scale in the manufacturing plant. Such conventionally necessary steps are bothersome because not only are they time consuming, they also require a complex correction procedure. It would be substantially easier to desensitize pick-ups prior to their installation.

European Patent Publication EP-A 0,089,209 (Griffen et al.), published on Sep. 21, 1983, calls for the application of testing loads to a scale after the load receiving scale platform has been rigidly connected to the measuring pick-up and after the measuring pick-up has been rigidly connected with the scale base, whereby these testing loads are to be applied prior to any compensating steps, for example, in the form of material removals or resistor adaptations in the strain gages.

Japanese Patent Publication 62-107033 (Tanaka), published on Nov. 10, 1988, discloses a device with additional pick-up elements positioned so that loads applied to the measuring pick-up caused by undesired moments or lateral forces, are picked-up and electronically corrected, whereby the measured value is corrected and a corrected load value is displayed. Even such an arrangement with additional pick-up elements or strain gages requires additional steps to be taken in the plant of the scale manufacturer.

Other attempts to minimize the effects of off-center load applications have been made, for example, by decoupling of lateral forces with the aid of roller bearings. These attempts also have their drawbacks, since such structural features with roller bearings are very expensive. Similar considerations apply to constructions in which the measuring or sensor body has a complicated and hence expensive geometry or where a multitude of pick-up elements, namely strain gages, are applied to the sensor body. All these conventional attempts aim at eliminating the effects of non-uniformities or non-symmetries in the sensor bodies or of angular or positional variations in the load applications or variations in the application of the strain gages to the sensor bodies. Incidentally, in this context, the term "measuring body" and the term "sensor body" are used as synonyms.

OBJECTS OF THE INVENTION

In view of the above it is the aim of the invention to achieve the following objects singly or in combination:

to provide a simple, yet effective procedure and apparatus for making measuring pick-ups less sensitive to the effects of changes in the load application and thereby also to effects of manufacturing tolerances that must be accepted to avoid unnecessarily expensive manufacturing procedures;

to provide a tuning procedure that can be performed in the manufacturing plant prior to installation of the pick-ups to make the pick-up less sensitive to effects other than the intended load effect;

to assure that all sensors of the same type or model have a uniform response characteristic in the intended load range;

to avoid the need for complicated and hence expensive sensor body geometries, and to also avoid the use of a multitude of sensor elements such as strain gages; and to avoid expensive tuning procedures after installation of such pick-ups into a scale or the like.

SUMMARY OF THE INVENTION

According to the invention there is provided a load measuring pick-up having a sensor body with a symmetry axis, which is made less sensitive to off-center load applications and thereby also to manufacturing tolerances, by the following steps:

(a) securing at least one pick-up element to said sensor body and holding the sensor body by at least one mounting at a mounting point, (b) applying a first off-center load in a first direction relative to said symmetry axis to said sensor body to produce a first output signal, (c) measuring said first output signal and correlating said first output signal to said first off-center load, (d) applying at least one second off-center load of the same size as said first off-center load to said sensor body in a second direction different from said first load application direction, (e) measuring a second output signal and correlating said second output signal to said second off-center load, (f) ascertaining from said first and second output signals whether an off-center load sensitivity of said pick-up is within a permissible tolerance range, and if necessary as a result of said ascertaining (g) performing at least one mechanical and/or electrical tuning of said pick-up.

According to the invention, there is further provided an apparatus for making a load measuring pick-up having a sensor body (1A, SB) with a symmetry axis and at least one strain gage (5) applied to said body, less sensitive to off-center load applications and thereby also to manufacturing tolerances, comprising a load application device (3, 3'), at least one mounting (2, 2') for said sensor body, a rotating device (M) for providing relative rotation between said sensor body (1A, SB) and said load application device (3, 3'), a control unit (11) having at least one input and a number of control outputs, a rotation sensor (10) connected to said at least one input of said control unit (11) to provide an input signal representing a relative rotational position between said sensor body and said load application device to said control unit (11), a signal amplifier (13) connected to said strain gage (5) to receive output signals from said strain gage (5), a comparator (12) connected to an output of said amplifier (13) and to a first control output of said control unit (11) providing rated tolerance values for comparing with said strain gage output signals, a tuning device (15), said comparator having a first output connected with an input of said tuning device (15), a display unit (14) connected to a second output of said comparator (12), for enabling said tuning device (15) to perform a tuning operation in response to said control unit (11) and in response to said comparator, and wherein said tuning device (15) has an output connected to a further input (14A) of said display unit (14).

The foregoing teachings of the invention avoid the conventional tuning of measuring pick-ups after these pick-ups have been installed in a scale or the like. The invention avoids complicated sensor body configurations or structures. The simple and hence inexpensive tuning of the sensors or pick-ups in the manufacturing plant makes the present sensors substantially non-sensitive to influences of lateral or cross-forces and thus against variations in the load application direction and position. This advantage makes sure that all pick-ups of the same model or type can be tuned in the plant so that each will have the same response characteristic in the intended load range independent of off-center load applications, whereby the number of rejects is minimized because any required corrective measures can be simply performed when the pick-ups are not yet installed in their final working position.

Another advantage of the invention is seen in that very simple features or steps permit the reduction of the so-called lateral sensitivity as much as necessary. The invention makes it possible for the first time to disregard complicated sensor body geometries while simultaneously avoiding the use of a multitude of strain gage elements applied to conventional sensor bodies. Yet, the invention achieves pick-ups that can be precisely manufactured for use for various purposes, for example, for mounting by a so-called pendulum mount or rocker pin load cell. According to the invention, precise measurements can be made even if the force introduction conditions should vary during actual measurements. This feature is especially advantageous for scales in which the pick-ups are no longer rigidly connected with a load introduction element on the one hand and with a bearing support in the scale base on the other hand.

A further advantage of the invention is seen in that the degree of desensitizing is fully within the control of the operator by repeating a checking and tuning operation if that should be necessary to obtain a certain desensitation. Further, a clear evaluation result is assured by applying the test load in two different load planes of the sensor body. Preferably, these load planes are positioned at right-angles relative to each other. A sensor body having a rectangular, especially square cross-section through that portion of the sensor body which forms the strain gage application surfaces, is particularly suitable for the present purposes. A sensor body with a square cross-section is easy to make.

By making sure that sequentially applied loads or forces to the same load plane of the sensor body have oppositely effective directions, it becomes easy to control the testing by checking the plus or minus sign and the size of the resulting output signals. If the measured output signals produced by sequentially applied testing loads have opposite plus or minus signs and substantially the same size, the measuring becomes precisely repeatable and the tuning by material removal and/or by resistor tuning becomes easily possible.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
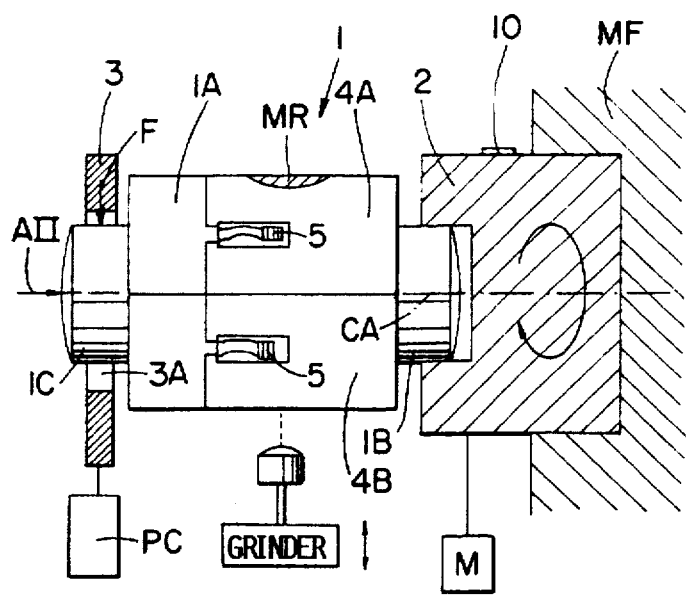
FIG. 1 is a side view, partially in section, of a testing apparatus according to the invention holding a sensor body of a pick-up and including a load applicator for applying a testing load to the sensor body.
Figure 2:
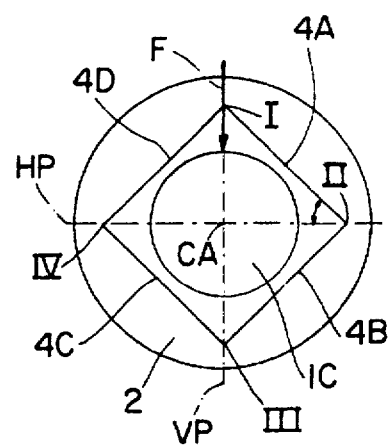
FIG. 2 is a view in the direction of the arrow AII with the load applicator omitted.

Referring to FIGS. 1 and 2, the present testing and tuning method of pick-ups can be performed by a very simple apparatus in which a pick-up 1 is mounted in a chuck 2 for rotation with the chuck 2 which is rotatably mounted in a machine frame MF. A motor M steps the chuck 2, preferably in 90° steps for rotation about a central symmetry axis CA of the sensor body 1A of the pick-up 1. The sensor body 1A has a clamping end 1B held in the chuck 2 and a free load application end 1C reaching into a load applicator 3 for applying a testing force F to the free end 1C of the sensor body 1A when the body 1A is held in a stationary position with one of its longitudinal edges facing up. The load applicator 3 is, for example, moved by a piston cylinder device PC for applying a defined load. It is possible to keep the sensor body 1A stationary altogether and stepping instead the applicator 3 with its drive PC around the axis CA in 90° steps.

As best seen in FIG. 2, in which the load applicator 3 is not visible, the sensor body 1A has a square cross-sectional configuration between its cylindrical ends 1B and 1C. The square configuration has four flat surfaces 4A, 4B, 4C, and 4D. One strain gage 5 is applied to at least one of these flat surfaces 4A to 4D. In this example embodiment four strain gages 5 are applied one to each surface.

As seen in FIG. 1, the load applicator 3 has a through-hole 3A which has a larger diameter than the diameter of the cylindrical free end 1C of the sensor body 1A so that the load applicator 3 is connected to the sensor body 1A in the manner of a pendulum mounting.

The chuck 2 may, for example, be a conventional three jaw chuck which is operated hydraulically or pneumatically. Any rotations of the chuck 2 may even be performed manually by the operator or, as mentioned, by a stepping motor M of conventional construction. The operation of the stepping motor and the respective load application by the applicator 3 is preferably coordinated and controlled by a program stored in a memory 11B of a control unit 11 shown in FIG. 4. The chuck 2 is lockable against further rotation in each of its rotated positions by a conventional locking device not shown. The locking device may be operated manually or automatically also in response to the program. A marker 10 is applied to the chuck 2 or to the sensor body 1A to indicate the particular rotational position. One such marker will be provided for each of the four 90° spaced positions.

A bending load is applied when the sensor body 1A is in the respective rotationally stepped position by lowering the applicator 3, for example with the piston cylinder device PC. Four rotational positions I, II, III, and IV are shown in FIG. 2. These rotational positions are spaced from one another by 90° and a uniform loading force F is applied to the sensor body 1A in each of these four positions I to IV for a testing sequence.

As seen in FIG. 2, in each of the load application positions I to IV, the flat planes 4A, 4B, 4C, and 4D are inclined by an angle of 45° to the horizontal plane HP and similarly by an angle of 45° to the vertical plane VP. Each of these planes 4A to 4D carries, as mentioned, for example one strain gage 5, which are preferably interconnected to form a conventional bridge circuit.

Figure 4:
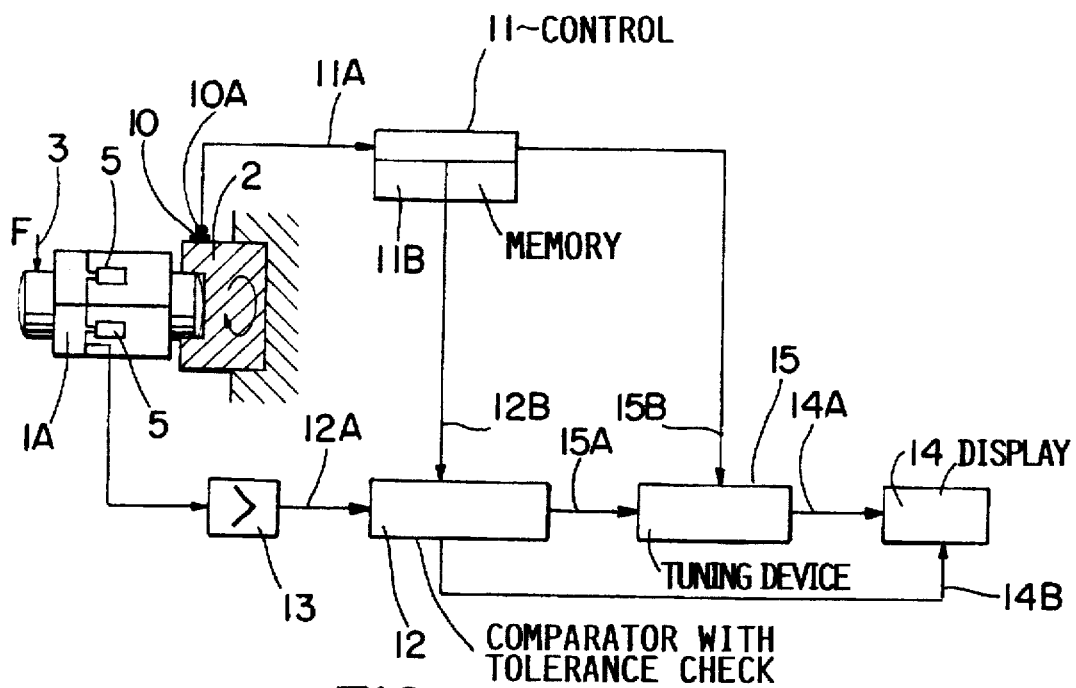
FIG. 4 is a block circuit diagram of an apparatus for performing the present testing and tuning.

Referring to FIG. 4, the bridge circuit formed by the strain gages 5 is connected with its output to an amplifier 13 which in turn is connected with its output to one input 12A of a comparator 12. The comparator 12 has a second input 12B connected to the above-mentioned control unit 11 which has an input 11A connected to the output of an angular position sensor 10A that senses the marker 10. A tuning device 15 is connected with one of its inputs 15A to the output of the comparator and with its other input 15B to the output of the control unit 11. A display 14 is connected with its input 14A to the output of the tuning circuit 15 and with its input 14B to a further output of the comparator 12. The control unit 11 is essentially a central processing unit that provides reference values or signals to the comparator 12. The reference values are stored in a memory 11B of the central control unit 11. The reference values are supplied from the control unit 11 to the input 12B of the comparator 12 in response to input signals received from the sensor 10A. The reference values establish the tolerance range in the comparator 12. A testing sequence program is stored in the memory 11B.

In operation, the sensor body 1A is turned into a starting position, for example I, and locked. Then the load applicator 3 is activated by pressurizing PC. Following temperature equalization, the output signal from each strain gage signal is sensed and displayed at 14, as well as recorded in the memory 11B that may be part of the control unit 14. Then, the load applicator 3 is released, the sensor body 1A is unlocked and then rotated into the second position II, wherein the sensor body is locked again and the load application, sensing and recording is repeated for each of the possible positions of the sensor body 1A.

Figure 5:
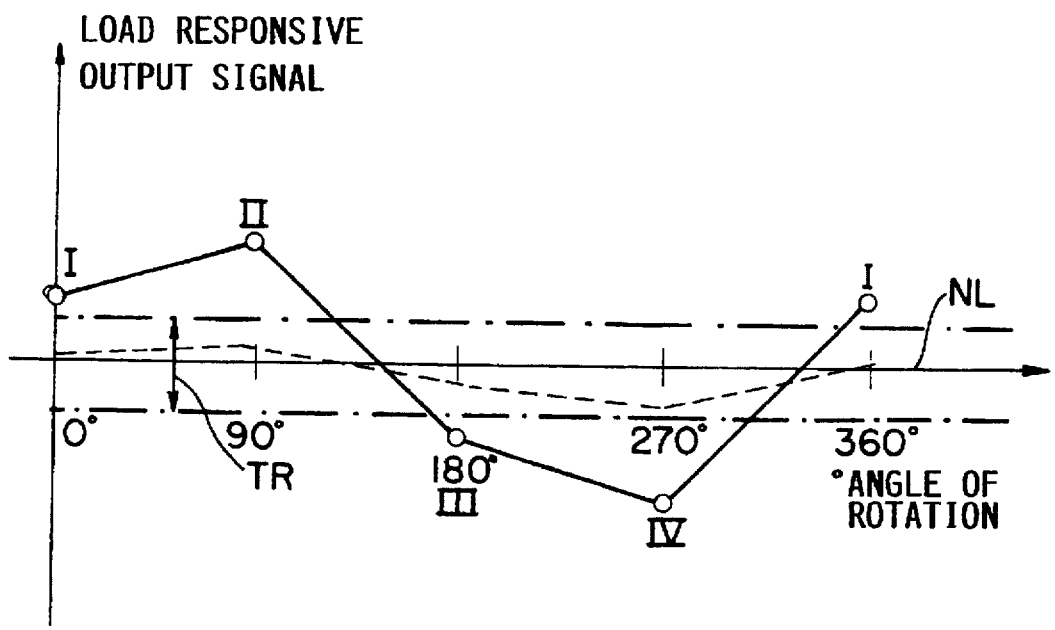
FIG. 5 shows four different measured output signals I, II, III, IV caused by respective load applications at different angular positions of the sensor body rotated in 90° steps.

In FIG. 5 the recorded values are shown by the full line curve which connects the actually measured values in the measuring positions I to IV. A dashed line curve connects rated values from the memory 11B within a permissible tolerance range TR. As shown, all four measured values at I, II, III, IV are outside the permissible tolerance range TR established by the above-mentioned reference values.

First, the output signals in the opposing load directions, namely I and III, or II and IV are respectively compared with each other in the comparator 12. If these measured signals or values are equal to each other in their size, and additionally have opposite plus or minus signs, the evaluation of the output signals can proceed and no further load application cycle needs to be performed. If the size of all output signals is within the tolerance range TR, no tuning of the sensor body 1A is necessary. The testing can now stop. However, in FIG. 5 all five measured values are outside the tolerance range TR. Therefore, a tuning operation is required. The fifth measured value is a repetition of the first measured value since 0° rotation and 360° rotation of the sensor body 1A coincide. A mechanical tuning is performed as follows. The sensor body 1 is rotated into a position in which the output signal has a positive sign. Next, material is removed mechanically from the sensor body along the upwardly facing respective ridge, for example at MR shown in FIG. 1. The mechanical material removal must not disturb the strain gages 5.

The material removal is performed in such a way that smooth transitions, rather than sharp edges, are provided between any cavity that results from the material removal MR and the surrounding area of the sensor body 1A. According to the measured values shown in FIG. 5, the material removal here takes place along the top edge of the sensor body 1A in its position I as shown in FIGS. 1 and 2, for example by a grinder with a suitable grinding head shown in FIG. 1.

Upon completion of the material removal MR along the ridge of position I, the sensor body 1A is brought into rotational position II which also yields a positive output signal as shown in FIG. 5. Here again, material is removed in the manner described above however, in the now upwardly facing second ridge. The volume or quantity of material removed depends on the size of the respective output signal. FIG. 5 shows that the second signal is positively larger than the first signal which means that more material must be removed along the second ridge than along the first ridge.

Upon completion of the material removing steps as described, the sensor body 1A is now subjected to a new load cycle. It is ascertained whether all output signals are now within the permitted tolerance range TR. If the newly measured set of values is not within the permissible tolerance range TR, the mechanical tuning operation by material removal described above is repeated by a further material removal or removals until all measured values are in the tolerance range TR.

If the tuning resulted in too much material removal, the sign plus or minus of the measured signals will be reversed so that now a tuning in the opposite direction will have to be made by removing material from the respective other ridges at III and IV.

It is a basic fact of strain gage sensors, that the responses of two strain gages applied to two planes that are at right angles to each other on a sensor body are independent of each other. As a result, the tuning in the rotational positions I and III or II and IV can be performed without any mutual influence. In other words, these tunings can be made independently of each other. However, it is advantageous to perform the loading and measuring sequence completely prior to the material removal and to then perform the tuning by material removal, whereby the measuring steps are separated from any machining steps thereby providing an efficient operation.

Referring further to FIG. 4, the control unit 11 supplies to the input 12B of the comparator 12 the above mentioned reference values that are stored in the memory 11B and may differ for different types of pick-ups. The reference values define the tolerance range TR shown by dash-dotted lines in FIGS. 5 and 8. The display unit 14 then shows whether a tuning as described above is necessary or not. If no tuning is necessary, the display unit shows a respective "OK" signal. However, if a tuning is required, the tuning unit 15 causes a rotation of the sensor body 1A into a position that presents the respective ridge of the sensor body 1A to a material removing tool such as the grinder shown in FIG. 1. The tuning unit 15 controls the operation of the material removing tool in response to a respective output signal from the comparator 12 which must coincide with a control signal from the control unit 11 in accordance with a respective program stored in the memory 11B. The display 14 may be equipped for indicating the angular position in which the material removal takes place and also to indicate the quantity of material to be removed and already removed. The material removal tool is merely shown as a grinder. However all conventional tools suitable for such material removal may be used.

Figure 3:
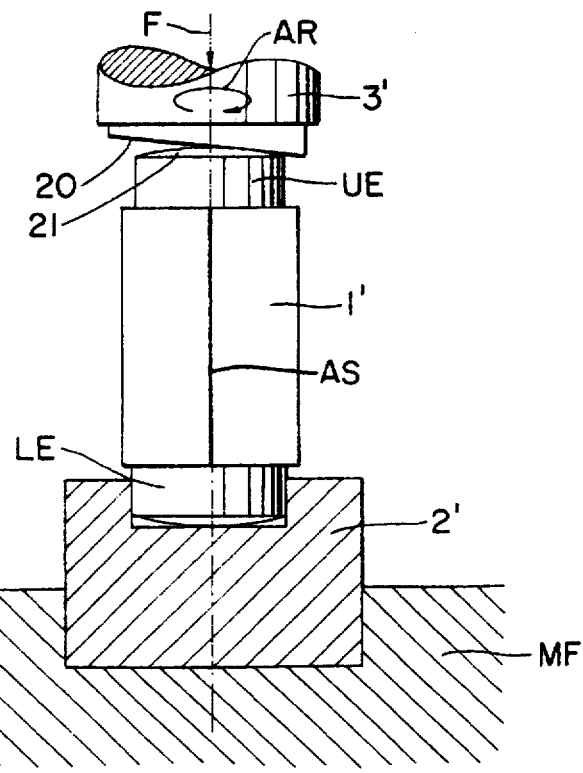
FIG. 3 shows a second embodiment of an apparatus according to the invention similar to that of FIG. 1, however, with a modified load applicator.

FIG. 3 illustrates a modified embodiment of a testing apparatus according to the invention. Both, in FIG. 1 and in FIG. 3 the respective load applicator 3, 3' applies a bending load to the sensor body 1A, 1' respectively. The chuck 2' mounted in a machine frame MF holds the lower end LE of the sensor body 1' against rotation. The load applicator 3' is rotatable preferably in 90° steps about the vertical axis of symmetry AS as indicated by the arrow AR. The load applicator 3' has a downwardly facing but slanted plane surface 20 in contact with an upwardly facing cambered or three-dimensionally curved surface 21 of the upper end UE of the sensor body 1'. The cooperating surfaces 20 and 21 also form a type of pendulum support. By rotating the load applicator 3' in 90° steps, bending loads are applied in different directions to the sensor body 1'. Otherwise, the sensor body 1' is also constructed with a square cross-section as described above with reference to FIG. 1. The sensing and measuring of output signals and their evaluation, as well as the material removal for the tuning are the same in FIG. 3 as described above with reference to FIGS. 1, 2, and 4, as well as 5.

The arrangement shown in FIG. 3 is preferably oriented so that the axis of symmetry AS extends vertically. Four separate material removing tools, such as grinders, may be positioned to cooperate with a respective one of the four edges of the vertically positioned sensor body 1'. However, a single grinder movable through a range of 360° could also be used for the above described material removal along the four edges of the body 1A or 1'.

Although it has been mentioned above that the chuck 2' in FIG. 3 holds the body 1' against rotation and the applicator 3' rotates, the arrangement could be reversed by holding the applicator 3' in a fixed position and rotating or stepping the chuck 2' in the same manner as has been described for the chuck 2 with reference to FIG. 1. The effect is the same since it does not matter which of the two cooperating surfaces 20 and 21 is stationary and which is rotating in 90° steps between load applications. No load is applied during rotation.

Instead of, or in addition to a tuning by means of material removal, it is possible to perform tuning by varying tuning resistances in the circuit arrangements of the strain gage elements 5. Suitable for this purpose are, for example, strain gage measuring bridge circuits applied to the sensor bodies 1A or 1' and having at least four strain gages in a bridge circuit, as will be described below with reference to FIGS. 11 and 12.

Figure 6:
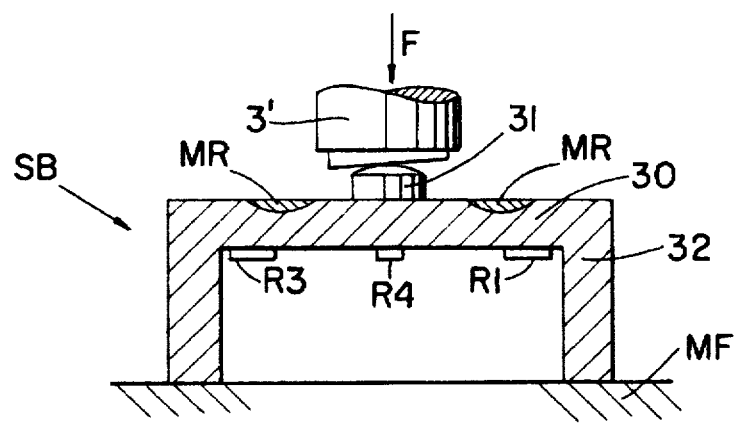
FIG. 6 shows a sectional view through a modified pick-up according to the invention having a hollow cylindrical cup-shaped sensor body with a centrally positioned load introduction member.
Figure 7:
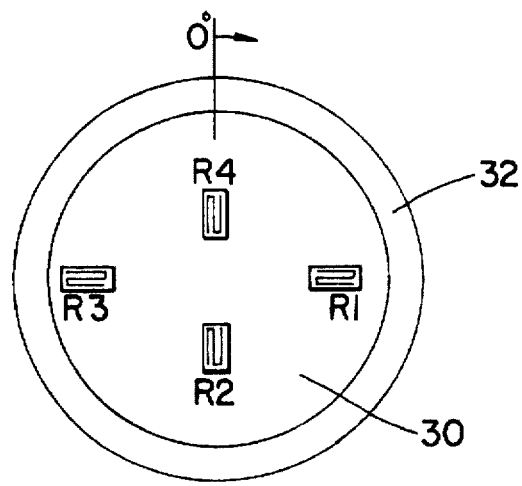
FIG. 7 shows a view into the hollow, cup-shaped sensor body of FIG. 6 to illustrate the arrangement of strain gages.

FIGS. 6 and 7 illustrate an arrangement of four strain gages R1, R2, R3, and R4 on the inner bottom surface of a cup-shaped hollow cylindrical sensor body SB having a disk-shaped cover 30 and a cylindrical ring wall 32 for mounting the sensor body SB in a machine frame MF. One could assume that the cover 30 is the bottom of the cup. FIG. 7 is a view into the open end of the sensor body SB. A load introduction member 31 having a cambered surface, as described above with reference to FIG. 3, cooperates with a load applicator 3' constructed also as described above for the application of the force F. The load introduction member 31 is mounted centrally to the upwardly facing outer surface of the cover 30 of the sensor body SB. When a load F is applied while restraining the body SB against rotation and moving the applicator 3' downwardly, the body SB, particularly the cover 30, is elastically deformed. The resulting deformations are sensed by the four strain gages R1, R2, R3 and R4. As shown in FIG. 7, the strain gages R1 and R3 are positioned close to the inner surface of the cylindrical wall 32 of the sensor body SB while the second pair of strain gages R2 and R4 are positioned closer to the load introduction point, namely closer to the center of the disk cover 30. Thus, the radially outer strain gages R1 and R3 measure deformations that are downwardly directed in the form of compressions of the cover 30 of the sensor body SB, while the strain gages R2 and R4 measure tension stress caused by the same load application to the member 31 on the cover 30.

Figure 11:
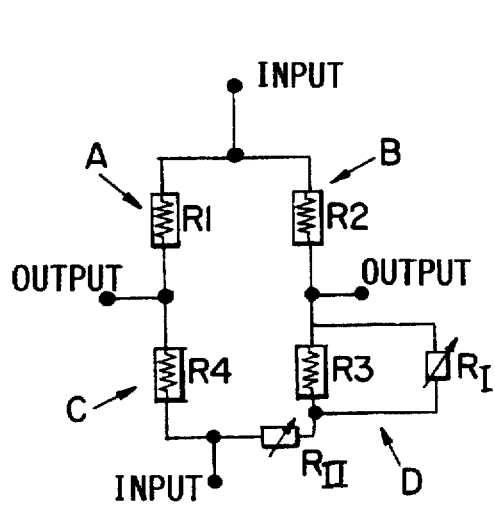
FIG. 11 shows a bridge circuit diagram for the arrangement of strain gages as shown in FIGS. 6 and 7 for an electrical tuning.

Referring to FIG. 11, the four strain gages R1, R2, R3 and R4 are interconnected to form a bridge circuit having four branches A, B, C, and D. A shunt resistor RI is connected in parallel to the strain gage R3. A series resistor RII is connected in series with the just mentioned parallel connection in the branch D. Bridge input terminals are provided between branches AB and CD. Bridge output terminals are provided between branches AC and BD.

The shunt resistor RI is adjustable and so is the series resistor RII. The adjustment of the resistances of the resistors RI and RII is performed by the operator in response to the output signals ascertained during the performance of the present method. As a result, an electrical tuning is achieved in response to the measured output signal as displayed in the display 14. Such electrical tuning may be applied either instead or in addition to the above mentioned mechanical tuning by material removal.

In all instances, the output signals are ascertained in response to the respective angular position of the sensor body. For this purpose, the pick-ups of FIGS. 9 and 10 as well as FIGS. 6 and 7 have a zero angular position 0° as shown in FIGS. 7 and 10. Here again, the angular position can be determined either by rotating the sensor body SB and keeping the load applicator stationary or vice versa. It may be preferable to mount the sensor body in a fixed position in a machine frame MF and rotate the load applicator 3'. However, the present method functions just as well when the applicator 3' is stationary and the sensor body is rotated in 90° increments.

The load application in the embodiments 6, 7, as well as 9 and 10 can also be performed as described above with reference to FIG. 1, whereby a load applicator 3 would engage the load input member 31 to apply a load horizontally or vertically, depending on the orientation of the mounting of the sensor body SB or 1A. In FIG. 3, for example, the longitudinal axis of the load applicator 3' and the longitudinal axis of the sensor body 1' are oriented vertically, yet the load application direction of the effective load component is horizontal due to the cooperation of the slanting surface 20 with the cambered surface 21.

Figure 8:
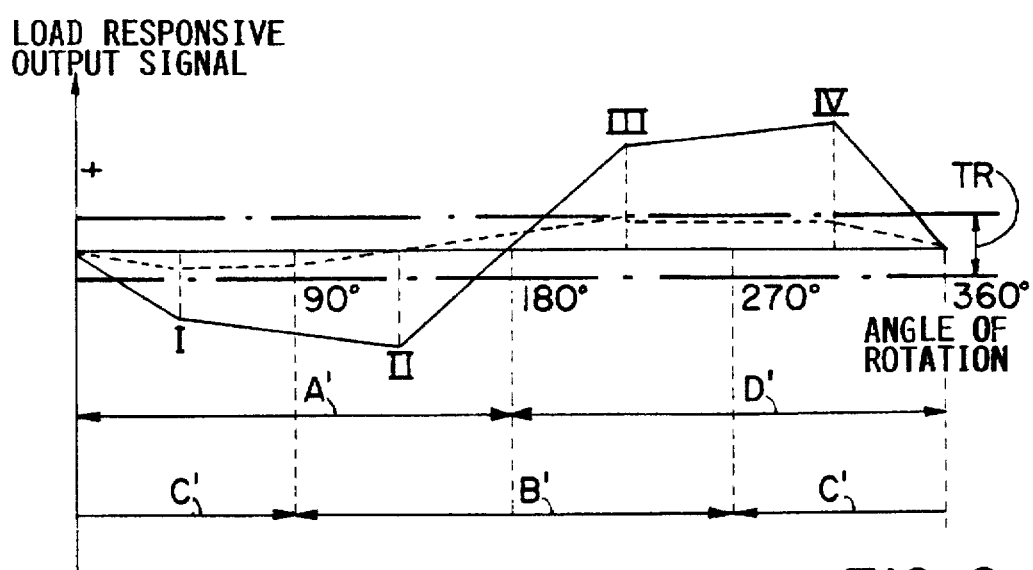
FIG. 8 illustrates the measured output signals as a function of 90° rotation steps of the sensor body with an allocation of the respective bridge circuit branches shown in FIGS. 11 and 12 to the corresponding rotational quadrant.

Referring to FIGS. 6 and 7, the operation of this embodiment will now be described with reference to FIG. 8. The zero position 0° of the sensor body SB corresponds to the off-center load application next to the strain gage R4. In the angular range between 0° to 180° the load application is coordinated with the bridge branch A formed by the strain gage R1 as shown in FIG. 11. In the range between 180° and 360° the load application is coordinated with the bridge branch D formed by the strain gage R3. In the range between 90° and 270° the load application is coordinated with the bridge branch B formed by the strain gage R2. In the range of 270° to 90° the load application is coordinated to the bridge branch C formed by the strain gage R4. These coordinations are shown in FIG. 8 by the lines A', B', C' and D', which designate the respective angular sections along the abscissa and which represent the respective bridge branches A, B, C and D.

Upon completion of a load application sequence in the rotational positions I, II, III, and IV, that bridge branch is ascertained which shows to have the highest sensitivity to off-center loads. In the example of FIG. 8 it is the bridge branch D that has the highest sensitivity in the positive direction. Bridge branch D is formed by the strain gage R3 which is provided with the above mentioned shunt resistor RI and series resistor RII. The shunt resistor RI provides a damping of the respective bridge branch D and the series resistor RII enables the restoration of the bridge symmetry. The resistances RI and RII can be added to the bridge circuit or the strain gages are provided with respective resistor branches that can be activated by opening respective conductors in the strain gage. In such an arrangement it is preferred to provide each bridge branch A, B, C, and D with such resistor arrangements forming part of the strain gages. The tuning is then performed by opening respective conductors. The sizes of the resistors RI and RII are determined by experimentation so that the ascertained values are then applicable to all tuning procedures for all pick-ups of the same model or type. After the application or activation of the resistors RI and RII, a further series of load applications is performed in order to check whether the output signals provided after the correction or tuning are within the tolerance range TR also shown in FIG. 8. It has been found that by varying the resistors RI and RII, it is possible to quickly bring the output signals into the tolerance range TR. By providing additional resistances, either for each bridge branch or only for the neighboring bridge branches B or C, activation or tuning of these resistors results in a quick reduction in the off-center sensitivity of the pick-ups to bring the output voltages measured by the strain gages into the tolerance range TR.

Figure 9:
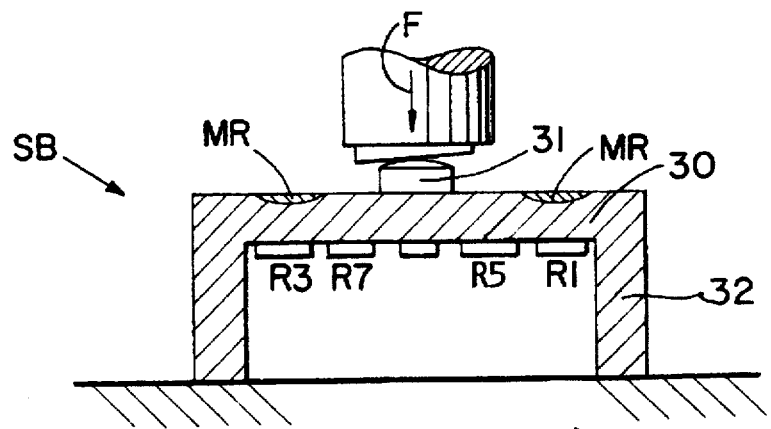
FIG. 9 is a view similar to that of FIG. 6, but illustrating the use of a twin set of four strain gages each.
Figure 10:
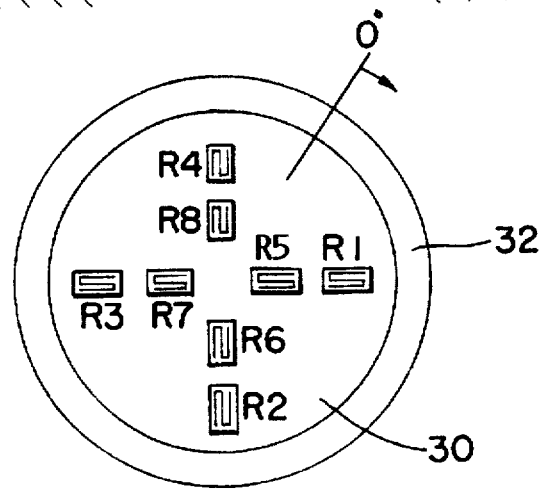
FIG. 10 is a view similar to that of FIG. 7 to show the positioning of the two sets of strain gages inside the cup-shaped, hollow sensor body.
Figure 12:
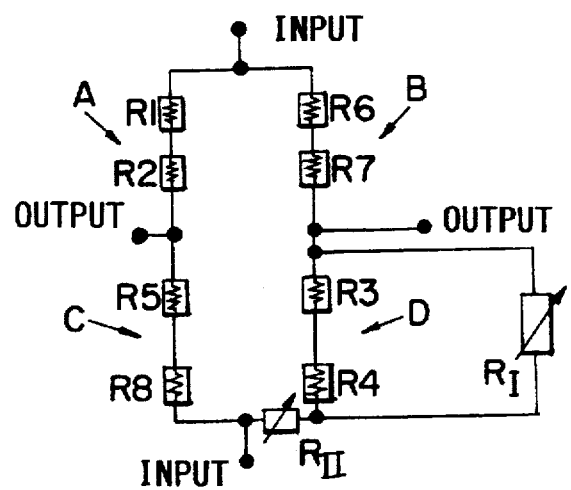
FIG. 12 shows a bridge circuit for the strain gage arrangement shown in FIGS. 9 and 10 for an electrical tuning.

FIGS. 9 and 10 illustrate a pick-up similar to that of FIGS. 6 and 9, however, as also shown in FIG. 12, a total of eight strain gages R1, R2, to R8 are used in this embodiment. Referring specifically to FIG. 10, the strain gages are arranged in pairs, whereby one member of a pair is arranged radially outwardly, while the other member of the same pair is arranged radially inwardly on the inwardly facing surface of the cover 30 of the sensor body SB. Strain gages R1 and R5 form a first pair. Strain gages R2 and R6 form a second pair. Strain gages R3 and R7 form a third pair and strain gages R4 and R8 form a fourth pair. Referring to FIG. 12, strain gages R1 and R2 are connected in series with each other in branch A of the bridge circuit. Strain gages R6 and R7 are connected in series with each other in branch B of the bridge circuit. Branch D of the bridge circuit comprises the strain gages R3 and R4 connected in series with each other and in parallel with the shunt resistor RI. This parallel connection in turn is connected in series with the resistor RII in branch D. Strain gages R5 and R5 connected in series with each other form branch C of the bridge circuit. The illustration of FIG. 8 also applies to the embodiment of FIGS. 9, 10, and 12. Bridge branch D shows the highest sensitivity to off-center load applications. In the embodiment of FIGS. 9, 10, and 12, adjustments of the resistors RI and/or RII also quickly bring the sensitivity of the pick-up to off-center load components into the permissible tolerance range TR. Here it is also possible to provide any of the other bridge branches with tuning or adjustment resistors. The mechanical and/or the electrical tuning may be used in all instances singly or in combination. 20 Material removal MR is shown in FIGS. 6 and 9 in the upwardly facing surface of the cover 30.

Figure 13:
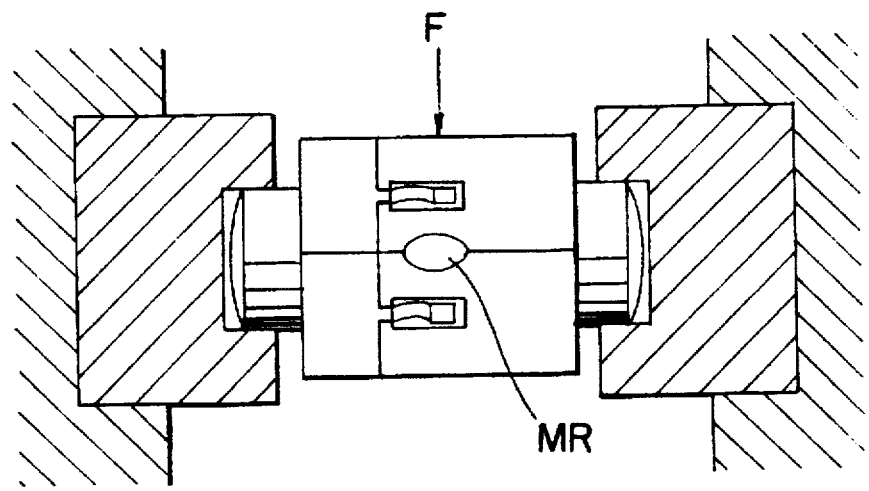
FIGS. 13 to 16 illustrate several possibilities for the application of a testing load to the sensor body of a pick-up.

FIG. 13 illustrates the fixed mounting of both sensor body ends and applying a testing force F centrally between the two mounted ends or points. The force F is preferably applied to a longitudinal ridge or edge of the sensor body.

Figure 14:
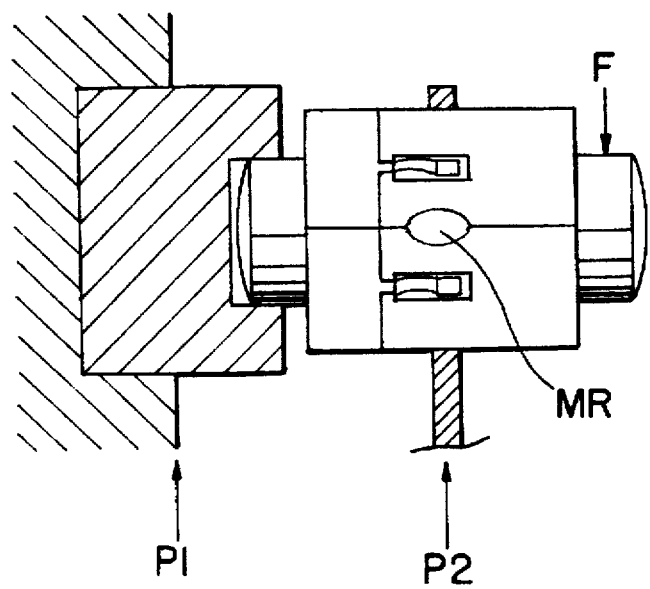

In FIG. 14 the sensor body is still supported at two points or in two planes namely P1 and P2 but the testing force F is now applied to a free end of the sensor body namely outside the two supported points.

Figure 15:
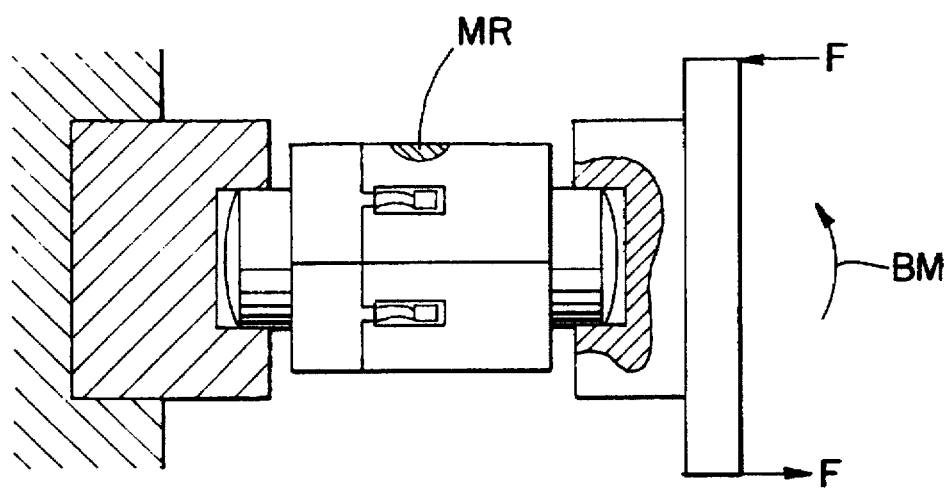

FIG. 15 shows the application of a bending moment BM to a sensor body rigidly held at one end and introducing two equal but oppositely directed forces with equal lever arms into the free end of the sensor body.

Figure 16:
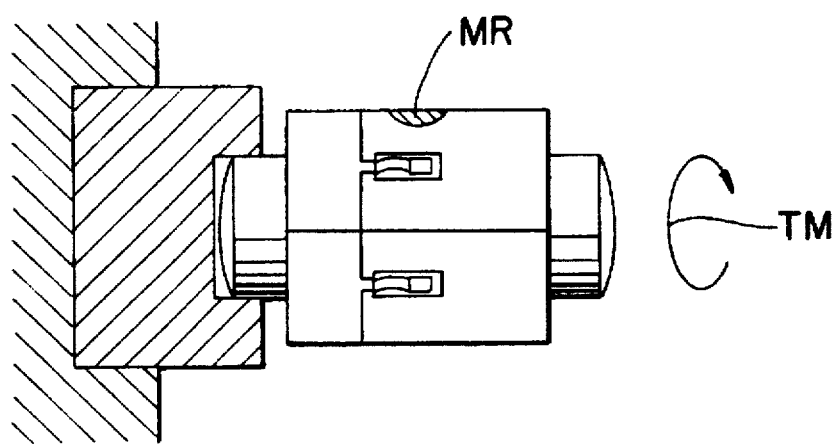

FIG. 16 shows the introduction of a torque moment TM into the free end of a sensor body, the other end of which is rigidly held or clamped as shown.

Although the invention has been described with reference to specific example embodiments, it will be appreciated that it is intended to cover all modifications and equivalents within the scope of the appended claims.

What we claim is:

1. A method for making a load measuring pick-up having a sensor body with a symmetry axis, less sensitive to off-center load applications, comprising the following steps:

(a) securing at least one pick-up element to said sensor body and holding the sensor body by at least one mounting, (b) applying a first off-center load in a first direction relative to said symmetry axis to said sensor body to produce a first output signal, (c) measuring said first output signal and correlating said first output signal to said first off-center load, (d) applying at least one second off-center load of the same size as said first off-center load, to said sensor body in a second direction different from said first load application direction, (e) measuring a second output signal and correlating said second output signal to said second off-center load, (f) ascertaining from said first and second output signals whether an off-center load sensitivity of said load measuring pick-up is within a permissible tolerance range, and if necessary as a result of said ascertaining (g) performing at least one of a mechanical tuning and an electrical tuning of said load measuring pick-up.

2. The method of claim 1, comprising performing, following a tuning, further load application steps, and ascertaining from said further load application steps whether a second tuning is necessary.

3. The method of claim 1, comprising performing said load application steps in two load application planes which preferably extend at right angles to each other.

4. The method of claim 3, comprising performing said load application steps with opposing load application directions in respective load application planes.

5. The method of claim 1, comprising rotating said sensor body about its axis of symmetry, preferably through an angle of 90°, following one load application, and holding said load application device in a fixed position for each load application.

6. The method of claim 1, comprising holding said sensor body at one end in said mounting and applying said load in an area of the other end of said sensor body.

7. The method of claim 6, comprising providing said load applicator with a plane load application surface (20) slanted relative to said axis of symmetry, providing said sensor body (1') with a cambered three-dimensionally curved end surface (21), and applying a load to said end surface (21) of said sensor body (1') through said slanted surface (21).

8. The method of claim 1, comprising holding said sensor body so that said axis of symmetry central axis extends horizontally or vertically.

9. The method of claim 1, comprising holding said sensor body at two points of said sensor body.

10. The method of claim 9, comprising applying a load between said two points of said sensor body.

11. The method of claim 9, comprising applying a load outside said two points of said sensor body.

12. The method of claim 1, comprising applying a load by introducing at least one of a torque moment and a bending moment into said sensor body at least at one mounting position.

13. The method of claim 1, comprising controlling rotational steps of said sensor body into load application positions or rotational steps of said sensor body into the tuning positions in response to a program stored in a memory of a control unit.

14. The method of claim 1, comprising performing said tuning by removing material portions (MR) from said sensor body.

15. The method of claim 1, comprising performing said tuning by adapting at least one of said pick-up elements applied to said sensor body and a mutual circuit arrangement of said pick-up elements.

16. The method of claim 15, comprising using at least four pick-up elements, preferably formed as strain gage strips, interconnecting said pick-up elements to form a measuring bridge circuit having bridge branches, and tuning at least one bridge branch of the measuring bridge by at least one step of damping said at least one bridge branch by a resistor and by modifying of a pick-up element.

17. The method of claim 16, wherein said resistor arrangement is formed by a shunting resistor connected in parallel to a bridge branch and by a series resistor connected in series with the pick-up element in the respective bridge branch.

18. An apparatus for making a load measuring pick-up having a sensor body (1A, SB) with a symmetry axis and at least one strain gage (5) applied to said body, less sensitive to off-center load applications, comprising a load application device (3, 3'), at least one mounting (2, 2') for said sensor body, a rotating device (M) for providing relative rotation between said sensor body (1A, SB) and said load application device (3, 3'), a control unit (11) having at least one input and a number of control outputs, a rotation sensor (10) connected to said at least one input of said control unit (11) to provide an input signal representing a relative rotational fixed position between said sensor body and said load application device to said control unit (11), a signal amplifier (13) connected to said strain gage (5) to receive output signals from said strain gage (5), a comparator (12) connected to an output of said amplifier (13) and to a first control output of said control unit (11) providing rated tolerance values for comparing with said strain gage output signals, a tuning device (15), said comparator having a first output connected with an input of said tuning device (15), a display unit (14) connected to a second output of said comparator (12), whereby said tuning device (15) is enabled to perform a tuning operation in response to said control unit (11) and in response to said comparator, and wherein said tuning device (15) has an output connected to a further input (14A) of said display unit (14).

19. The apparatus of claim 18, wherein the load application device (3) comprises a plane load application surface (20) extending at a slant to said axis of symmetry of said sensor body (SB, 1'), and wherein said sensor body (SB, 1') comprises a three-dimensionally curved or cambered end surface (21) cooperating with said plane, slanted load application surface (20).

20. The apparatus of claim 19, wherein said sensor body comprises a cup-shaped hollow cylindrical configuration with a flat cover at one end of a cylindrical wall, and wherein said mounting comprises a support surface for said cylindrical wall of said sensor body.

* * * * *